United States Patent [19]
Thompson et al.

[11] 3,994,838
[45] Nov. 30, 1976

[54] POLY(PHOSPHAZENE) VULCANIZATES AND FOAMS

[75] Inventors: James E. Thompson, Euclid; Richard W. Sicka, Brecksville, both of Ohio

[73] Assignee: Horizons Incorporated, a division of Horizons Research Incorporated, Cleveland, Ohio

[22] Filed: Dec. 9, 1974

[21] Appl. No.: 530,654

[52] U.S. Cl. .................. 260/2.5 R; 260/2.5 FP; 260/42.29; 260/42.37; 428/310
[51] Int. Cl.² ................. C08J 9/00; C08K 3/36; C08K 5/14
[58] Field of Search ............ 260/2 P, 2.5 R, 2.5 FP, 260/42.29, 42.37

[56] References Cited
UNITED STATES PATENTS

| | | |
|---|---|---|
| 3,061,577 | 10/1962 | Pruett ............................ 260/42.29 |
| 3,271,355 | 9/1966 | Vanderbilt et al. ............. 260/42.37 |
| 3,370,029 | 2/1968 | Cannelongo ...................... 260/28.5 |
| 3,373,134 | 3/1968 | Yasui et al. .................... 260/42.37 |
| 3,664,403 | 5/1972 | Doran ................................ 152/330 |
| 3,702,833 | 11/1972 | Rose et al. ........................... 260/2 P |
| 3,853,794 | 12/1974 | Reynard et al. ..................... 260/2 P |
| 3,856,712 | 12/1974 | Reynard et al. ..................... 260/2 P |
| 3,856,713 | 12/1974 | Rose et al. ........................... 260/2 P |
| 3,876,566 | 4/1975 | Koshak et al. ................. 260/2.5 HA |

*Primary Examiner*—John Kight, III
*Attorney, Agent, or Firm*—Lawrence I. Field

[57] ABSTRACT

Fire resistant poly(phosphazene) vulcanizates can be produced as foams or as foam coatings. The resulting articles exhibit excellent flame retardancy.

22 Claims, No Drawings

POLY(PHOSPHAZENE) VULCANIZATES AND FOAMS

This invention herein described was made in the course of or under a contract or subcontract with the United States Government.

This invention relates to fire-resistant polyphosphazene polymers which exhibit a high degree of flame retardancy and which do not generate large amounts of smoke or toxic products when ignited or exposed to relatively high temperatures.

More specifically, it relates to low density polyphosphazenes as foams and coating materials with outstanding thermal stability and to vulcanizable compositions of poly(phosphazenes) and insulating foams made therefrom.

The polyphosphazenes to which the present invention is applicable include those described in U.S. Pat. Nos. 3,515,688 issued June 2, 1970; 3,370,020 issued Feb. 20, 1968; 3,700,629 issued Oct. 24, 1972 and 3,702,822 issued Nov. 14, 1972 and to polyphosphazenes described in "Phosphorus-Nitrogen Compounds" by Allcock, published 1972, and elsewhere in the literature.

It is particularly adapted for use with poly(aryloxyphosphazenes) of the type described in copending U.S. Pat. application Ser. No. 368,845 filed June 11, 1973 and now issued as U.S. Pat. No. 3,856,713 on Dec. 24, 1974; namely, copolymers represented by the general formula:

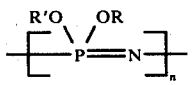

where $n$ is 50 to 50,000 and in which R and R' represent different aryl groups.

For purposes of illustration, and not by way of limitation, the invention is described as it applies to poly(aryloxyphosphazenes) of the type described in the above noted patent application, but it will be readily apparent to others skilled in the art that it is applicable to other polyphosphazenes.

Briefly the invention comprises the preparation of such polyphosphazenes as vulcanizable and foamable compositions and the production of vulcanizates, foams or foamed coatings from such compositions.

The poly(aryloxyphosphazenes) were prepared in the manner described in copending U.S. Pat. No. 3,856,713 the disclosure of which is incorporated herein by reference.

For purposes of illustration, the following is a description of the preparation of a phenoxy-4-ethylphenoxyphosphazene copolymer.

Hexachlorophosphazene was purified by distillation (b.p. 120°–125° C/10 mm Hg) and recrystallization (n-heptane), and was polymerized under vacuum at 250° C, generally in the presence of HCl (1 mmole per 2600–2800 g monomer). The aryloxides were prepared by addition of sodium methoxide (10 mole % over P-Cl equivalents) to a dry equimolar (5 mole % excess over sodium methoxide) solution of phenol and 4-ethylphenol in bis(2-methoxyethyl) ether as about 1.5 liter/mole of sodium methoxide. The methanol produced was removed by addition of benzene followed by azeotropic distillation. Purified $[Cl_2PN]_n$ polymer was dissolved in dry benzene (ca. 1 liter solvent/100 g polymer) and added slowly over 3 to 5 hours to a refluxing (125° C) solution of sodium aryloxides and temperature was maintained at 125° ± 1° C for 50 to 55 hours. The reaction mixture was cooled to 80° C or lower and copolymer was precipitated by addition to twice the total volume of methanol or ethanol/water (10v/1v). The copolymer was washed briefly with methanol and stirred well with water/methanol (or ethanol) (1v/1v) for one to two days. The polymer was thrice dissolved in 8 to 16 liters of tetrahydrofuran, precipitated into 10 to 15 gallons of distilled water and washed with methanol or isopropyl alcohol.

Vulcanizates of the copolymer are prepared by mixing with each 100 parts by weight of copolymer, up to 500 parts by weight of one or more fillers, 1 to 10 parts by weight of MgO or ZnO, and 1 to 20 parts by weight of curing agent (peroxide). Other optional ingredients include plasticizers, processing aids and otherwise conventional additives. A coagent such as triallylcyanurate, trimethylolpropane trimethacrylate, ethylene glycol dimethacrylate, or other compounds with alkenyl functionality of two or higher may also be used.

Preferred vulcanizates of the copolymer were prepared by mixing copolymer with 20 to 200 parts by weight of filler per hundred parts by weight of copolymer, 5 or 6 parts by weight of MgO and several parts by weight of peroxide curing agent.

The vulcanizate mix was milled, calendered, and cut to a preform charge which was molded at 290° to 320° F for 15 minutes and could be further postcured for 24 hours at 212° F.

Tensile strengths up to 2410 psi and ultimate elongations of 50% to 530% were obtained from the resulting vulcanizates as shown in Table I which follows.

Table I

Physical Property Evaluation of $[(C_6H_5O)_2PN-(4-C_2H_5C_6H_4O)_2PN]_n$ Vulcanizate Formulations (all constituents are in parts by weight)

|  | A | B | C | D | E | | | | |
|---|---|---|---|---|---|---|---|---|---|
| Copolymer | 100 | 100 | 100 | 100 | 100 | | | | |
| Calcium Carbonate | — | — | 40 | — | 40 | | | | |
| Burgess KE | — | — | — | 100 | — | | | | |
| Burgess B-22-KD | 10 | 10 | — | — | — | | | | |
| Anhydrous Kaolin | 10 | 10 | — | — | — | | | | |
| High Activity MgO | 5 | 5 | 5 | 6 | 5 | | | | |
| Dicumyl Peroxide | 3 | 3 | — | 4 | 3 | | | | |
| Benzoyl Peroxide (wet) | — | — | — | — | 1 | | | | |
| Varox Powder | — | — | 5 | — | — | | | | |
| Triallylcyanurate | — | 2 | — | — | — | | | | |
| Cure | | | | | | | | | |
| Press, 15 min. at ° F | 290 | 290 | 320 | 320 | 290 | 290 | 300 | 290 | 290 |
| Oven, Hrs. at 212° F | 0 | 24 | 0 | 24 | 0 | 24 | 24 | 0 | 24 |
| Tensile Strength (psi) | 1050 | 1580 | 760 | 1060 | 1140 | 1420 | 2410 | 490 | 1020 |
| 100% modulus (psi) | 480 | 640 | — | — | 170 | 180 | — | 30 | 90 |

Table I-continued

Physical Property Evaluation of [(C₆H₅O)₂PN-(4-C₂H₅C₆H₄O)₂PN]ₙ Vulcanizate Formulations
(all constituents are in parts by weight)

|  | A | B | C | D | E |  |  |  |  |
|---|---|---|---|---|---|---|---|---|---|
| 200% modulus (psi) | — | — | — | — | 700 | 650 | — | 170 | 330 |
| Elongation % | 187 | 217 | 50 | 50 | 265 | 330 | 80 | 488 | 530 |

Burgess KE = Anhydrous aluminum silicate treated with vinyl tris(2-methoxysilane).
Burgess B-22-KD = Anhydrous aluminum silicate treated with γ-aminopropyltriethoxysilane.
Varox Powder - 50% active blend of 2,5-bis(tert-butylperoxy)-2,5-dimethyl hexane on inert mineral filler.

Formulations for the preparation of foams are similar to those for the preparation of vulcanizates including, in addition, about 1 to 40 parts by weight of a chemical blowing agent and any activator necessary for the blowing agent. Several preferred formulations are shown in Table II.

Foams were produced from such formulations by confinement of a sample preform in a pressurized, preheated mold to obtain a slight precure, and removal of the hot sample for final expansion and cure in a forced air oven.

The sample preform was the same length and width as the mold, and about 125% of the depth. Precure was accomplished by confinement of the sample preform in the mold under pressure for up to 8 minutes at 230° F to 260° F. Final expansion and cure was effected in a forced air oven for 5 to 60 minutes at 285° F to 350° F with a linear expansion of slightly more than double for most samples. A free blown sample (i.e. no premold) also produced a good foam.

The addition of a small amount of zinc stearate (4 to 14 parts by weight per hundred parts of copolymer) resulted in marked improvement of pore size and uniformity.

The foams exhibited excellent properties when tested according to the National Bureau of Standards Smoke Test as may be seen from the physical property data in Table II.

Table II

NBS Smoke Test on [(C₆H₅O)₂PN-(4-C₂H₅C₆H₄O)₂PN]ₙ
Foam (Flaming Condition)

|  | Commercial FR Foam | I | II | III | IV |
|---|---|---|---|---|---|
| Density, pounds/ft³ | 6 | 5.9 | 4.3 | 9.4 | 6.7 |
| Limiting Oxygen Index, % | 29 | 25 | 31 | 31 | 48 |
| D$_{max}$ | 234 | 156 | 77 | 114 | 45 |
| T to D$_s$=16, min. | 0.2 | 0.2 | 0.9 | 0.9 | 1.5 |
| R$_m$, max. rate, min⁻¹ | 149 | 50 | 40 | 60 | 11 |
| HCl, ppm | — | — | 0 | 0 | 0 |
| CO₂, ppm | — | 6000 | 1400 | 1400 | 3000 |
| CO, ppm | — | 800 | 200 | 200 | 100 |
| HCN, ppm | — | 30 | 7 | 7 | 10 |
| Foam Formulation |  |  |  |  |  |
| Copolymer | 100 | 100 | 100 | 100 |  |
| Calcium Carbonate | 40 | — | — | — |  |
| Hydrated Alumina | — | 100 | 100 | 200 |  |
| High Activity MgO | 5 | 5 | 5 | 5 |  |
| Varox Powder | 5 | 5.7 | 3 | 8 |  |
| Benzoyl Peroxide (wet) | 1 | 1.4 | 1.6 | 2 |  |
| Azodicarbonamide | 15 | 21.2 | 15 | 30 |  |
| Surface Treated Urea | 10 | 14.1 | 10 | 20 |  |
| Zinc Stearate | — | 4 | 10 | 14 |  |
| Cure, Min/° F | 1/270 | 5/230 | 5/230 | 6/230 |  |
| Oven Expansion, Min/° F | 15/300 | 60/300 | 25/285 | 15/300 |  |
| Compression resistance at 25% deflection (psi) | 0.9 | 2.2 | 4.8 | 2.1 |  |
| Tensile strength (psi) | — | 20 | 60 | 20 |  |
| Elongation, % | — | 80 | 125 | 90 |  |

Outstanding thermal stability of the low density [(C₆H₅O)₂PN—(4—C₂H₅C₆H₄O)₂PN]ₙ foams as compared to other commercial fire-resistant thermal insulations has been demonstrated in isothermal aging tests at 300° F. Poly(aryloxyphosphazene) samples remained flexible after 408 hours with little change in density, while other foam materials shrank and embrittled, as evidenced by the results in Table III.

Table III

Density (lbs/ft³) of Foams After
Isothermal Aging at 300° F

| (Hrs/300° F) | Commercial Foam A FR Tube | Commercial Foam B Black | [(C₆H₅O)₂PN-(4-C₂H₅C₆H₄O)₂PN]ₙ Phosphazene Foam |
|---|---|---|---|
| 0 | 5.2 | 6.0 | 6.2 |
| 24 | 7.0 | 11.5 | 7.2 |
| 48 | 7.6 | 10.3 | 7.8 |
| 144 | 7.0 | 10.1 | 7.9 |
| 168 | 6.6 | 10.4 | 7.0 |
| 312 | — | 9.9 | 7.4 |
| 408 | — | 10.8 | 7.1 |
| Percent Gain After 408 hours | — | 80.0 | 15.0 |

All samples except the phosphazene foam were rigid after 24 hours at 300° F.

Foams with densities as low as 3.4 lbs/ft³ have been produced, and foams of lower density are possible. The pore size and closed cell structure appeared quite uniform under microscopic examination.

The [(C₆H₅O)₂PN—(4—C₂H₅C₆H₄O)₂PN]ₙ foams aged in a static air oven at 300° F were compared to commercially available fire-retardant thermal insulation for changes in density and compression resistance at 25% deflection. Changes in density with time shown in Table III show very little change in the [(C₆H₅O)₂PN—(4—C₂H₅C₆H₄O)₂PN]ₙ foam density as compared with up to 80% gain in density for a commercial foam after 408 hours at 300° F.

Compression resistance at 25% deflection of [(C₆H₅O)₂PN—(4—C₂H₅C₆H₄O)₂PN]ₙ foam was unchanged after 168 hours and was reasonably low (12.5 psi) after 600 hours at 300° F. Commercial fire-retardant foam sheets became rigid after 24 hours and crumbled when tested at 96 hours. Compression resistance at 25% deflection ranged from 0.9 to 4.8 psi for all [(C₆H₅O)₂PN—(4—C₂H₅C₆H₄O)₂PN]ₙ foams tested.

Tensile strengths of 20 to 35 psi were obtained for [(C₆H₅O)₂PN—(4—C₂H₅C₆H₄O)₂PN]ₙ foams in the desired density range, with tensile strengths of up to 82 psi for higher density foams. Ultimate elongations ranged from 80 to 175%.

While the invention has been described with particular reference to a copolymer in which phenoxy and 4-ethylphenoxy groups are present in the copolymer in substantially equimolar proportions, similar fire resistant foams have been produced from [(CH₃O)₂PN—(4—ClC₆H₄O)₂PN]ₙ, [(C₆H₅O)₂PN—(p-sec- $C_4H_9C_6H_4O)_2PN]_n$, $[(C_6H_5O)_2PN-(m-CH_3C_6H_4O)_2PN-(p-CH_3C_6H_4O)_2PN]_n$ and $[(n-CH_3C_6H_4O)2PN-(p-CH_3C_6H_4O)_2PN]_n$ and can be produced from any of the poly(aryloxyphosphazenes) described in U.S. Pat. No. 3,856,713 issued Dec. 24, 1974 or more broadly from polymers having a degree of polymerization between about 50 and 50,000 and consisting of repeating units randomly distributed along a —P=N— backbone and represented by at least one of the general formulae:

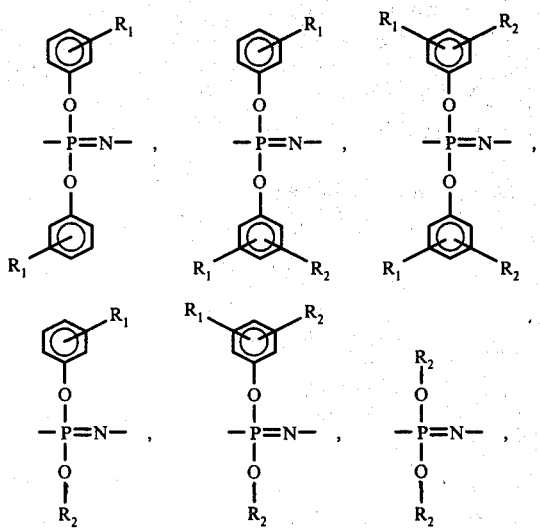

in which $R_1$ represents hydrogen, bromine, chlorine, alkyl radicals selected from the group of primary alkyls with 1 to 12 carbon atoms, secondary alkyls with 4 to 12 carbon atoms and $\alpha,\alpha$-dimethyl tertiary alkyls with 4 to 14 carbon atoms, $R_2$ is alkyl as defined for $R_1$, with the proviso that $R_1$ when alkyl or halogen, and $R_2$ when substituted on an aryl ring, are substituted at the meta or para position, and the $R_1$'s and $R_2$'s need not all be the same. In addition, for cure enhancement, a small amount (0.1 to 5 mole %) of an alkenyloxy or an alkenyl substituted aryloxy such as one derived from vinyl phenol, allyl phenol, isoeugenol or eugenol may be present on the phosphorus atom.

It will be readily appreciated that other peroxides may be used in place of dicumyl or benzoyl peroxide, other plasticizers may be used in place of zinc stearate and other fillers may be used in place of those disclosed without departing from the intended scope of the invention which is defined in the appended claims.

The present invention provides a process for the preparation of fire retardant, low smoking, thermally stable oil resistant vulcanizates and closed cell foams which are made from the poly(phosphazene) polymers described above. The process comprises:
preparing a suitable mixture;
milling the mixture;
cutting the product to a preform charge; and
either molding said preform charge under heat and pressure to produce a vulcanizate or molding said preform charge to produce a precured slab which is expanded and vulcanized in an oven to produce a foam.

We claim:
1. A composition for the preparation of a fire retardant, low-smoking, non-dripping, oil-resistant vulcanizate comprising for each 100 parts by weight of poly(phosphazene) polymer:
up to 350 parts by weight of filler;
3 to 20 parts by weight of MgO or ZnO;
20 to 200 parts by weight of reinforcing filler selected from the group consisting of silane surface treated silica, silane surface treated clay and silane treated alumina;
up to 30 parts by weight plasticizer or processing aid;
up to 10 parts by weight of at least one compound with alkenyl functionality of two or higher; and
1 to 15 parts by weight of at least one organic peroxide;
the phosphazene polymer having a degree of polymerization of 50 to 50,000 and consisting of repeating units randomly distributed along a —P=N— backbone and represented by at least one of the general formulae:

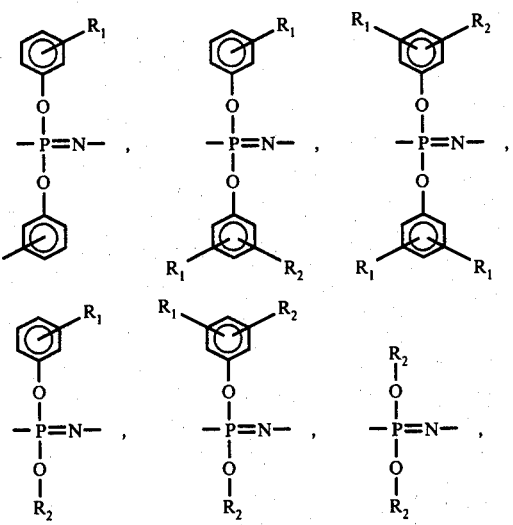

in which $R_1$ represents hydrogen, bromine, chlorine, alkyl radicals selected from the group of primary alkyls with 1 to 12 carbon atoms, secondary alkyls with 4 to 12 carbon atoms and $\alpha,\alpha$-dimethyl tertiary alkyls with 4 to 14 carbon atoms, $R_2$ is alkyl as defined for $R_1$ with the proviso that $R_1$ when alkyl or halogen, and $R_2$ when substituted on an aryl ring, are substituted at the meta or para position, and the $R_1$'s and $R_2$'s need not all be the same.

2. The composition of claim 1 wherein the reinforcing filler is a silane surface treated clay.

3. The composition of claim 1 wherein the filler is hydrated alumina.

4. The composition of claim 1 wherein the reinforcing filler is silane treated hydrated alumina.

5. The composition of claim 1 containing 3 to about 6 parts of MgO, 2 to about 7 parts of peroxide and 20 to 200 parts of reinforcing filler.

6. A process for producing a fire retardant, low-smoking non-dripping, oil resistant vulcanizate comprising preparing a mixture consisting of the composition of claim 1,
milling and then calendering said mixture, preparing a preform of the resulting product and vulcanizing said preform.

7. The process of claim 6 wherein the preform is molded at 230° to 350° F for 5 to 30 minutes whereby a vulcanizate is produced.

8. The process of claim 6 including in addition the step of post curing the molded material for up to 24 hours at 200° to 250° F.

9. The composition of claim 1 wherein the groups attached to the —P=N— backbone include between 0.1 and 5 mole % of an alkenyloxy or an alkenyl substituted aryloxy group selected from the group consisting of vinyl phenol, allyl phenol, isoeugenol and eugenol.

10. An article produced by the process of claim 6.

11. A composition suitable for the preparation of a fire retardant, low-smoking, non-dripping, oil-resistant closed cell foam comprising for each 100 parts of poly(phosphazene)polymer:
 up to 350 parts by weight of hydrated alumina;
 3 to 20 parts by weight of MgO or ZnO;
 up to about 50 parts by weight of a plasticizer and processing aid;
 up to 10 parts by weight of coagent consisting of compounds with alkenyl functionality of two or higher;
 between about 1 and 70 parts by weight of a chemical blowing agent and any necessary activator for said blowing agent;
 between about 1 and 15 parts by weight of at least one organic peroxide curing agent;
 the phosphazene polymer having a degree of polymerization of 50 to 50,000 and consisting of repeating units randomly distributed along a —P=N— backbone and represented by at least one of the general formulae:

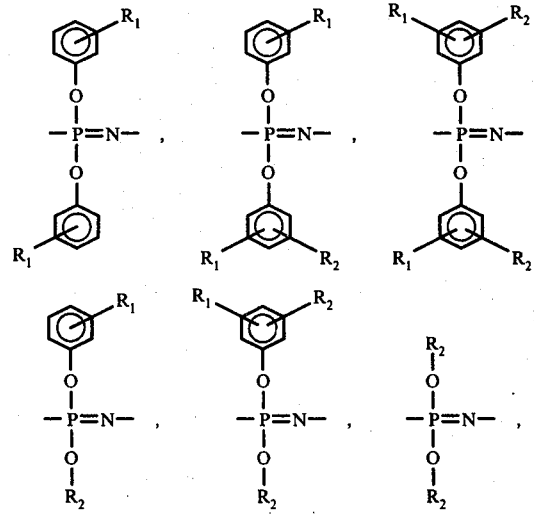

in which $R_1$ represents hydrogen, bromine, chlorine, alkyl radicals selected from the group of primary alkyls with 1 to 12 carbon atoms, secondary alkyls with 4 to 12 carbon atoms and $\alpha,\alpha$-dimethyl tertiary alkyls with 4 to 14 carbon atoms, $R_2$ is alkyl as defined for $R_1$ with the proviso that $R_1$ when alkyl or halogen, and $R_2$ when substituted on an aryl ring, are substituted at the meta or para position, and the $R_1$'s and $R_2$'s need not all be the same.

12. The composition of claim 11 wherein the blowing agent is azodicarbonamide.

13. The composition of claim 11 wherei the plasticizer is a metallic stearate.

14. The composition of claim 11 wherein the organic peroxide curing agent comprises a mixture of a first peroxide effective at a relatively low temperature and a second peroxide effective at a higher temperature.

15. The composition of claim 14 wherein the peroxides are benzoyl peroxide and dicumyl peroxide.

16. The composition of claim 14 wherein the peroxides are benzoyl peroxide and 2,5-bis(tert-butylperoxy)-2,5-dimethyl hexane.

17. A process for producing a fire retardant, low-smoking, non-dripping, oil-resistant, closed cell foam which comprises:
 preparing a mixture consisting of the composition of claim 11;
 milling and then calendering said mixture, preparing a preform from the resulting product, precuring said material in a mold under pressure, then expanding and vulcanizing said material in an oven.

18. A process for producing a fire retardant, low-smoking, non-dripping, oil-resistant closed cell foam which comprises:
 preparing a mixture consisting of the composition of claim 11;
 milling and then calendering said mixture, preparing a preform rom the resulting product and expanding and vulcanizing said material in an oven.

19. The process of claim 17 including, in addition the step of post curing the material for up to 24 hours at 200° to 300° F.

20. Foamed poly(phosphazene) polymers with a degree of polymerization of 50 to 50,000 consisting of repeating units randomly distributed along a —P=N— backbone and represented by at least one of the general formulae:

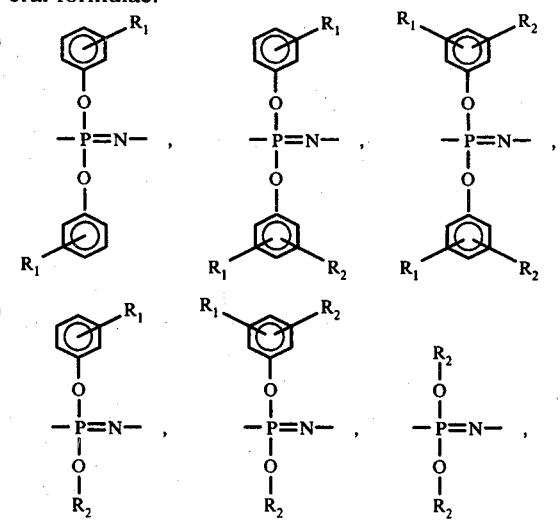

in which $R_1$ represents hydrogen, bromine, chlorine, alkyl radicals selected from the group of primary alkyls with 1 to 12 carbon atoms, secondary alkyls with 4 to 12 carbon atoms and $\alpha,\alpha$-dimethyl tertiary alkyls with 4 to 14 carbon atoms, $R_2$ is alkyl as defined for $R_1$ with the proviso that $R_1$ when alkyl or halogen, and $R_2$ when substituted on an aryl ring, are substituted at the meta or para position and the $R_1$'s and $R_2$'s need not all be the same.

21. An article covered with the foam of claim 19.

22. A composition which produces a low-smoking, low-flame spread index closed cell foam comprising:
 100 parts by weight of [$(C_6H_5O)_2PN$—$(4$—$C_2H_5C_6H_4O)_2PN$] copolymer;
 200 parts by weight of hydrated alumina;
 5 parts by weight of magnesium oxide;
 8 parts by weight of a 50% active blend of 2,5-bis(tert-butylperoxy)-2,5-dimethyl hexane on inert mineral filler;
 2 parts by weight of wet benzoyl peroxide;
 30 parts by weight azodicarbonamide;
 14 parts by weight zinc stearate; and
 20 parts by weight surface treated urea.

* * * * *